A. E. SIMPSON.
TOOL FOR FORMING TAPER HOLES.
APPLICATION FILED JULY 28, 1920.

1,355,065. Patented Oct. 5, 1920.

INVENTOR
ALBERT E. SIMPSON
BY Harrow and Harrow
ATTORNEYS

UNITED STATES PATENT OFFICE.

ALBERT EDWARD SIMPSON, OF BURY, ENGLAND.

TOOL FOR FORMING TAPER-HOLES.

1,355,065.    Specification of Letters Patent.    Patented Oct. 5, 1920.

Application filed July 28, 1920. Serial No. 399,484.

*To all whom it may concern:*

Be it known that I, ALBERT EDWARD SIMPSON, a subject of the King of Great Britain, residing at 80 Heywood street, Bury, in the county of Lancaster, England, have invented a new and useful Improved Tool for Forming Taper-Holes, of which the following is a specification.

My invention relates to combined drilling and reaming tools for forming taper holes at one operation in which the end of the tool is formed to start, and continue to form, the hole and constitutes the drilling portion of the said tool, and the following portion is tapered and constitutes the reaming portion of the said tool. In tools, of the aforesaid kind, it has been proposed to form threads extending across the whole of the surface between the spiral grooves, or flutes, whereby a number of stepped cutting points are formed at the leading, or cutting, edges of the reamer portion of the tool and this invention has for its object to provide an improved tool of this kind whereby friction on the work and the torsional strain set up in the tool when in use are considerably reduced and the danger of the said tool breaking is consequently minimized. This, according to my invention, is effected by forming a number of stepped cutting points on the leading, or cutting, edges only of the reaming portion of the tool.

Figure 1:
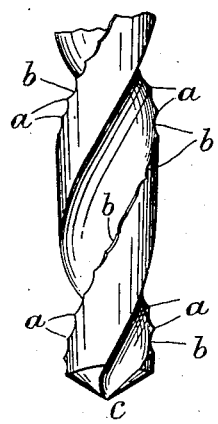
Figure 2:
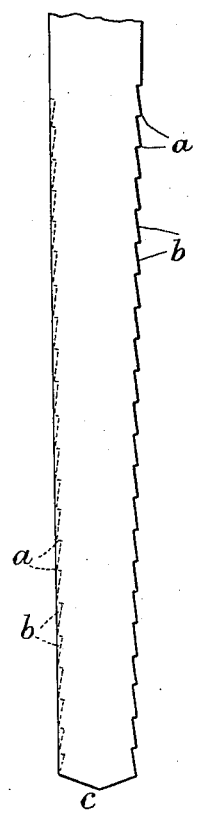

The accompanying drawing illustrates sufficient portions of tools made in accordance with this invention, Figure 1 showing the invention applied to a spiral tool and Fig. 2 showing it applied to a flat tool.

In both figures the stepped cutting points hereinbefore referred to are marked *a*, and the spaces, or clearances, between the cutting points which avoid, as much as possible, non-cutting frictional action against the sides of the hole, are marked *b*.

The tool in each case is shown as having the end *c* formed to start, and continue to form, the hole, the following part of the tool forming the taper and acting as a reamer.

The following is a further explanation of how the tool may be made in comparison with the making of an ordinary twist drill.

The drill is made with a taper, say 1 for example in 48 which is the standard for taper pins.

The distortion which results from the hardening process is rectified, in the case of ordinary drills, by grinding the "land" portion of the drill, by means of an abrasion wheel, while the drill rotates on its axis. When grinding the taper drill at this final operation, the periphery of the abrasive wheel is made of such shape as to form cutting points on the leading edges only of the drill in accordance with this invention. Supposing the drill to make, for instance, eight rotations for each inch which the abrasive wheel travels in a longitudinal direction relatively to the axis of the drill, eight ratchet-shaped teeth are formed per inch in the length of the drill, these teeth being portions of a screw-thread.

What I claim is:—

A combined drilling and reaming tool, of the kind aforesaid, for forming taper holes, the said tool being formed with a number of stepped cutting points confined to the leading, or cutting, edges only of the reaming portion so as to reduce non-cutting frictional contact with the sides of the hole; substantially as hereinbefore explained.

In testimony whereof I have signed my name to this specification in the presence of two subscribing witnesses.

ALBERT EDWARD SIMPSON.

Witnesses:
 ERNALD S. MOSELEY,
 GEORGE WEAVER.